United States Patent
Arakawa

(10) Patent No.: US 6,527,349 B2
(45) Date of Patent: Mar. 4, 2003

(54) HYDRAULIC BRAKE DEVICE

(75) Inventor: Haruo Arakawa, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/988,073

(22) Filed: Nov. 16, 2001

(65) Prior Publication Data

US 2002/0060112 A1 May 23, 2002

(30) Foreign Application Priority Data

Nov. 17, 2000 (JP) .................................. 2000-351661

(51) Int. Cl.⁷ .................................................. B60T 8/44
(52) U.S. Cl. ...................................... 303/114.3; 303/4
(58) Field of Search .................. 188/322.19, 322.22; 303/4, 122, 113.3, 114.1, 114.2, 114.3, 115.1, 31, 22; 60/553

(56) References Cited

U.S. PATENT DOCUMENTS

| | | | |
|---|---|---|---|
| 3,559,406 A | | 2/1971 | Gardner |
| 4,244,185 A | * | 1/1981 | Belart .......................... 60/550 |
| 4,743,071 A | * | 5/1988 | Iwamoto .................... 188/353 |
| 4,753,069 A | * | 6/1988 | Seibert et al. ........... 303/114.1 |
| 4,753,074 A | * | 6/1988 | Belart et al. ............. 303/114.1 |
| 4,759,591 A | * | 7/1988 | Reinartz et al. ....... 188/DIG. 2 |

* cited by examiner

*Primary Examiner*—Christopher P. Schwartz
*Assistant Examiner*—Xuan Lan Nguyen
(74) *Attorney, Agent, or Firm*—Burns, Doane, Swecker & Mathis, LLP

(57) ABSTRACT

A hydraulic brake device includes a cylinder, a larger diameter piston movable within the cylinder in response to operation of a brake booster power piston, a smaller diameter piston engaged with and movable relative to the larger diameter piston in response to movement of a brake operation member, a floating piston engaged with the smaller diameter piston and movable relative thereto, a first pressure chamber defined by the larger diameter piston and the smaller diameter piston, a second pressure chamber defined by the cylinder and the floating piston and hydraulically connected to a wheel brake, and a relief chamber defined by the cylinder and the larger diameter piston. A switching device is disposed between the larger and smaller diameter pistons for normally interrupting fluid communication between the first pressure chamber and the relief chamber and for establishing fluid communication therebetween when the larger and smaller diameter pistons are relatively moved.

18 Claims, 3 Drawing Sheets

HYDRAULIC BRAKE DEVICE

This application is based on and claims priority under 35 U.S.C. §119 with respect to Japanese Patent Application No. 2000-351661 filed on Nov. 17, 2000, the entire content of which is incorporated herein by reference.

FIELD OF THE INVENTION

This invention generally relates to a vehicle brake system. More particularly, the present invention pertains to a hydraulic brake device used in a vehicle brake system.

BACKGROUND OF THE INVENTION

A known hydraulic brake device is disclosed in U.S. Pat. No. 3,559,406. This hydraulic brake device includes a large diameter piston movable by a power piston of a vacuum booster actuated to generate boosting force by utilizing a vacuum source of the engine upon braking operation. A small diameter piston is fitted into the inner periphery of the large diameter piston to be movable relative to the large diameter piston upon functional failure of the vacuum booster.

In operation, when the large diameter piston receives the boosting force from the vacuum booster, a sufficient stroke for supplying brake pressure to a wheel brake cylinder is needed and a relatively large axial length is necessary for the piston to achieve braking operation considering the positional relationship between the cylinder portion and the sealing member disposed for sealing the cylinder portion. Further, in the event the vacuum booster fails, the small diameter piston has to move within the inner periphery of the large diameter piston for a sufficient stroke to effectively achieve the braking operation. Thus, the axial length of the large diameter piston has to have a sufficient length, and this undesirably lengthens the entire piston.

Thus, a need exists for a hydraulic brake device having a piston of reduced length as compared to the known hydraulic brake device described above.

A need also exists for a hydraulic brake device which possesses a shortened piston, but which nevertheless can be manufactured relatively easily and at a relatively low cost.

SUMMARY OF THE INVENTION

According to one aspect of the present invention, a hydraulic brake device includes a large diameter piston movable within a cylinder in response to a operation of a power piston of a booster, a small diameter piston engageable with an inner periphery of the larger diameter piston and movable relative to the large diameter piston in response to the brake operation, a floating piston engageable with the small diameter piston and movable relative to the small diameter piston, a first pressure chamber defined by the large diameter piston, the small diameter piston and the floating piston, a second pressure chamber defined by the cylinder and the floating piston, and a relief chamber defined by the cylinder and the large diameter piston. A switching device is disposed between the large diameter piston and the small diameter piston to control fluid communication between the first pressure chamber and the relief chamber to normally interrupt the fluid communication between the first pressure chamber and the relief chamber and to establish fluid communication between the first pressure chamber and the relief chamber upon relative movement between the large diameter piston and the small diameter piston.

During braking operation, when the booster is actuated to boost the brake force, the floating piston moves relative to the small diameter piston in the first pressure chamber formed by the large and small diameter pistons and the floating piston. In the event the booster function fails, both the floating piston and the small diameter piston move integrally in the first pressure chamber. This advantageously permits the axial length of the large diameter piston or small diameter piston to be shortened compared to the pistons used in other known devices, thus facilitating the manufacturing process and reduce the cost.

According to another aspect of the invention, a hydraulic brake device includes a cylinder, a larger diameter piston movable within the cylinder in response to movement of a power piston of a brake booster, a smaller diameter piston engaged with an inner peripheral portion of the large diameter piston and movable relative to the larger diameter piston in response to operation of a brake operation member, a floating piston engaged with the smaller diameter piston and movable relative to the smaller diameter piston, a first pressure chamber defined by the larger diameter piston, the smaller diameter piston and the floating piston, a second pressure chamber defined by the cylinder and the floating piston and hydraulically connected to a wheel brake cylinder, and a relief chamber defined by the cylinder and the larger diameter piston. A seal member is provided on one of the larger diameter piston and the smaller diameter piston for interrupting fluid communication between the first pressure chamber and the relief chamber, and a port is provided on the other of the larger diameter piston and the smaller diameter piston, with fluid communication between the first pressure chamber and the relief chamber being established by way of the port upon relative movement between the larger diameter piston and the smaller diameter piston.

In accordance with another aspect of the invention, a hydraulic brake system for a vehicle includes a brake operation member operated by a driver of the vehicle to generate a brake operation force, a booster device having a power piston operatively connected to the brake operation member for boosting the brake operation force generated by the brake operation member, a wheel brake cylinder for producing braking force in response to the brake operation force, and a brake device. The brake device includes a cylinder, a larger diameter piston movable within the cylinder in response to movement of the power piston of the booster, a smaller diameter piston engaged with an inner peripheral portion of the larger diameter piston and movable relative to the larger diameter piston in response to the operation of the brake operation member, a floating piston engaged with the smaller diameter piston and movable relative to the smaller diameter piston, a first pressure chamber defined by the larger diameter piston and the smaller diameter piston, a second pressure chamber defined by the cylinder and the floating piston and hydraulically connected to the wheel brake cylinder, a relief chamber defined by the cylinder and the larger diameter piston, and a switching device disposed between the larger diameter piston and the smaller diameter piston. The switching device normally interrupts fluid communication between the first pressure chamber and the relief chamber and establishes fluid communication between the first pressure chamber and the relief chamber upon relative movement between the larger diameter piston and the smaller diameter piston.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
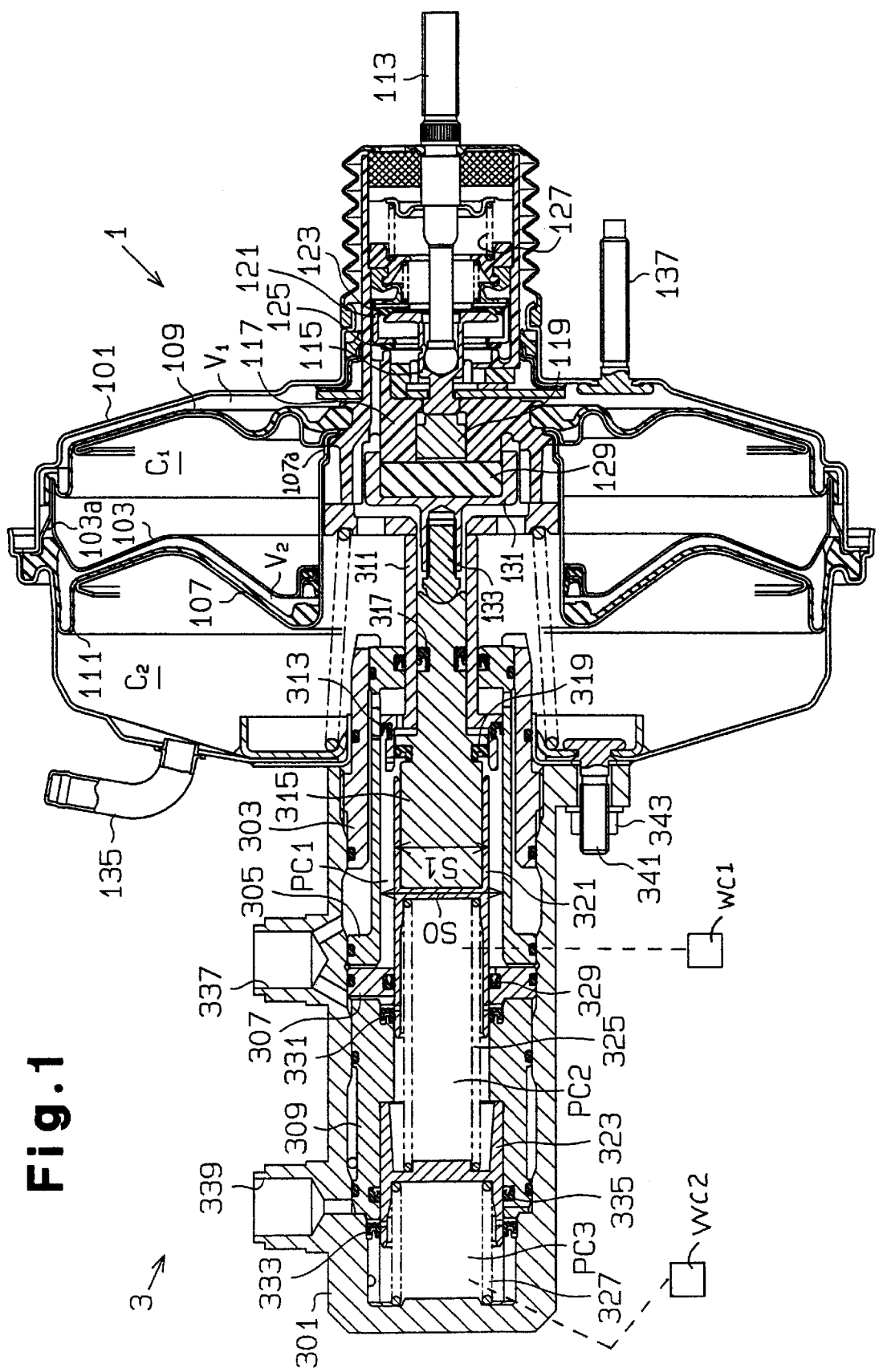
FIG. 1 is a cross-sectional view of a hydraulic brake device combined with a booster in accordance with the present invention.

A hydraulic brake system for a vehicle in accordance with the present invention includes a brake booster and a hydraulic brake device. Referring initially to FIG. 1, the brake booster 1 is adapted to be actuated by the vacuum from an engine of the vehicle to generate a boosting force providing a brake operation force (pedal depression force). The booster 1 includes a housing 101 having an interior. A fixed partition wall 103, a pair of movable partition walls 105, 107 and a pair of diaphragms 109, 111 are disposed inside the housing 101 to form within the housing interior a pair of variable pressure chambers V1, V2 and a pair of constant pressure chambers C1, C2. The air pressure in the variable pressure chambers V1, V2 is variable in accordance with the brake operation force, while a vacuum or negative pressure is always introduced into the constant pressure chambers C1, C2 from the engine. The two constant pressure chambers C1, C2 are in communication with each other in a known manner such as by way of an air passage 107a formed in the movable partition wall 107, and the two variable pressure chambers V1, V2 are in communication with each other in a known manner such as by way of an air passage 103a formed in the fixed partition wall 103.

An input rod 113 is connected to a brake pedal (a brake operation member) of the vehicle. When the brake pedal is depressed by a driver of the vehicle, the depression force is inputted to the booster via the input rod 113. An air valve 115 is fixed to the input rod 113 and is actuated in response to the movement of the rod 113. The forward end of the air valve 115 is inserted into or positioned in a power piston 117 of the booster 1 and is engaged with an intermittent or intermediate rod 119 provided in the power piston 117. The power piston 117 is connected to the pair of movable partition walls 105, 107. An air valve seal 123 is supported by a valve retainer 121 and is in contact with the air valve 115 when the brake is not operated for interrupting communication between the inside of the booster 1 and the atmospheric pressure.

Further, the valve retainer 121 supports a control valve seal 125 to maintain a clearance between the control valve seal 125 and the power piston 117 to allow fluid communication between the two variable pressure chambers V1, V2 and the two constant pressure chambers C1, C2 when the brake is not operated (i.e., the condition shown in FIG. 1).

The valve retainer 121 is always biased to the left as viewed in FIG. 1 by a spring 127. A reaction disc element or plate 129 is provided in the power piston 117 and an output rod 131 is engaged with the reaction disc plate 129. An adjusting rod 133 is positioned in the output rod 131 and projects in the forward direction (i.e., toward the left as viewed in FIG. 1). The projecting amount of the adjusting rod 133 is adjustable to adjust the axial length of the power piston 117. A vacuum inlet 135 is provided on the housing 101 for communication between the constant pressure chambers C1, C2 and an engine intake manifold to introduce vacuum or negative pressure into the chambers C1, C2. A stud bolt 137 is provided to connect the booster housing 101 to a stationary portion of the vehicle in the engine compartment. Although FIG. 1 only shows a single stud bolt 137, it is to be understood that a plurality of such bolts are used for securing the booster 1 to the vehicle.

FIG. 1 also illustrates the hydraulic brake device 3 that includes a cylinder body 301 in which a first body piece 303, a second body piece 305, a third body piece 307, and a fourth body piece 309 are disposed in a liquid-tight manner. A larger diameter piston 311 is slidably positioned in the second body piece 305 and a first seal 313 is disposed between the second body piece 305 and the large diameter piston 311. A smaller diameter piston 315 is disposed in the larger diameter piston 311 for relative sliding movement within the larger diameter piston 311. A second seal 317 and a third seal 319 are provided between the outer peripheral portion of the smaller diameter piston 315 and the inner peripheral portion of the larger diameter piston 311 for effecting a seal.

A first floating piston 321 is disposed on the smaller diameter piston 315 at the forward portion of the smaller diameter piston 315 (i.e., the left side as viewed in FIG. 1) so that relative sliding movement between the first floating piston 321 and the smaller diameter piston 315 is possible. A second floating piston 323 is slidably disposed in the fourth body piece 309 at the forward side of the first floating piston 321. A first return spring 325 is disposed between the first and second floating pistons 321, 323, and a second return spring 327 is disposed between the second floating piston 323 and the closed end of the cylinder body 301.

A fourth seal 329 is provided between the third body piece 307 and the first floating piston 321, and a fifth seal 331 is provided between the fourth body piece 309 and the first floating piston 321. A sixth seal 333 is disposed between the cylinder body 301 and the second floating piston 323, and a seventh seal 335 is provided between the fourth body piece 309 and the second floating piston 323.

A first pressure chamber PC1 is defined by the larger diameter piston 311, the smaller diameter piston 315 and the first floating piston 321. A second pressure chamber PC2 is defined by the first floating piston 321 and the second floating piston 323. A third pressure chamber PC3 is defined by the second floating piston 323 and the closed end of the cylinder body 301. The second and third pressure chambers PC2, PC3 are connected to respective wheel brake cylinders (schematically shown as WC1 and WC2 in FIG. 1) of the vehicle brake system to supply wheel brake pressure to the wheel brake cylinders.

The rear end (i.e., the right side) of the larger diameter piston 311 is engaged with the power piston 117 of the booster 1 as shown in FIG. 1. In addition, the smaller diameter piston 315 is engaged with the adjusting rod 133.

The cylinder body 301 is provided with a pair of inlet ports 337, 339 which are to be connected to a reservoir tank for supplying brake fluid to the hydraulic brake device 3. A plurality of weld bolts 341 and nuts 343, one of each of which is shown in FIG. 1, are used for connecting the hydraulic brake device 3 to the front end surface of the booster 1.

Figure 2:
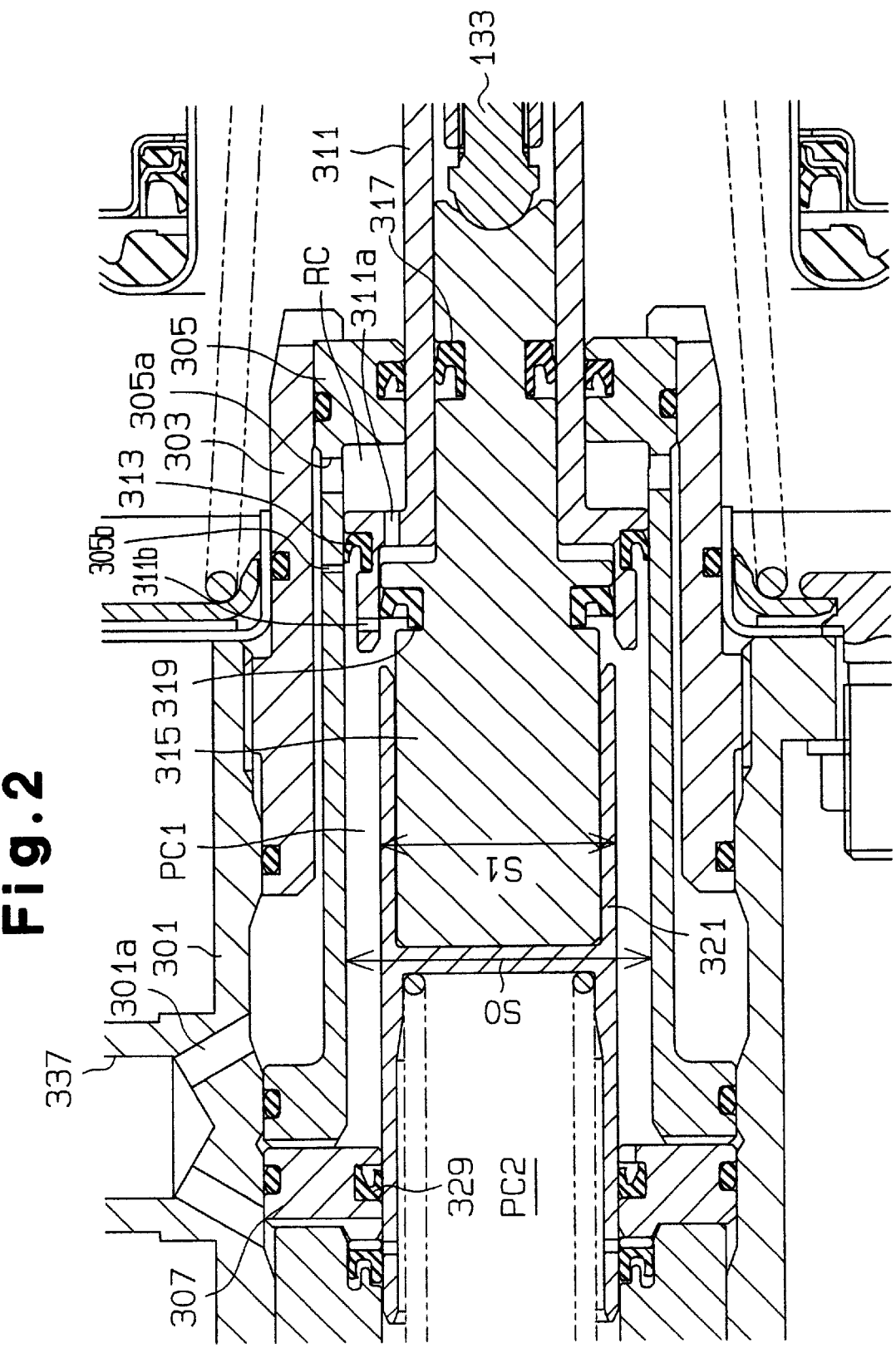
FIG. 2 is an enlarged cross-sectional view of a portion of the hydraulic brake device shown in FIG. 1.

FIG. 2 illustrates additional details associated with the hydraulic brake device 3. A port 311a is provided on the large diameter piston 311 and is in fluid communication with the inlet port 337 via a relief chamber RC, a port 305a formed on the second body piece 305 and a port 301a formed in the cylinder body 301. The relief chamber RC is defined by the large diameter piston 311 and the second body piece 305. Another port 305b is also provided on the second body piece 305. In addition, the larger diameter piston 311 is provided with a further port 311b that is located forward of (i.e., to the left) of the third seal 319 as viewed in FIG. 2.

The operation of the hydraulic brake device 3 is as follows. When the brake is not operated, the first pressure chamber PC1 is in communication with the reservoir tank through the port 305b provided on the second body piece 305, the port 301a provided on the cylinder body 301 and the inlet port 337 also provided on the cylinder body 301. Thus, the first pressure chamber PC1 is under atmospheric pressure. In the condition that the engine is normally operated, the constant pressure chambers C1, C2 are under vacuum due to the communication with the engine intake manifold. Under these conditions, when the brake is operated through depression of the brake pedal by the driver of the vehicle, the air valve 115 is moved forward (i.e., to the left as viewed in FIG. 1) by the input rod 113 connected to the brake pedal. The air valve seal 123 and the control valve seal 125 both supported by the valve retainer 121 are then moved together by the force of the spring 127 which biases the valve retainer 121 in the forward direction (i.e., to the left). The control valve seal 125 engages the power piston 117 to close the valve and interrupt communication between the variable pressure chambers V1, V2 and the constant pressure chambers C1, C2. Further movement of the air valve 115 causes the air valve 115 to disengage from the air valve seal 123 to open the valve for allowing atmospheric pressure to flow into the variable pressure chambers V1, V2. A pressure differential is thus generated between the variable pressure chambers V1, V2 and the constant pressure chambers C1, C2. Due to this pressure differential, the movable partition walls 105, 107 are moved to the left together with the power piston 117.

The brake operation force at the air valve is transmitted to the reaction disc plate 129 via the intermediate rod 119 together with the boosting force to the power piston 117 and is then transmitted to the output rod 131 and the adjusting rod 133 to push the smaller diameter piston 315 in the forward direction (i.e., to the left in FIG. 1). At the same time, the power piston 117 moves the larger diameter piston 311 directly to the left or in the forward direction. Eventually, the larger diameter piston 311 and the smaller diameter piston 315 are moved integrally to the left or in the forward direction.

Figure 4:
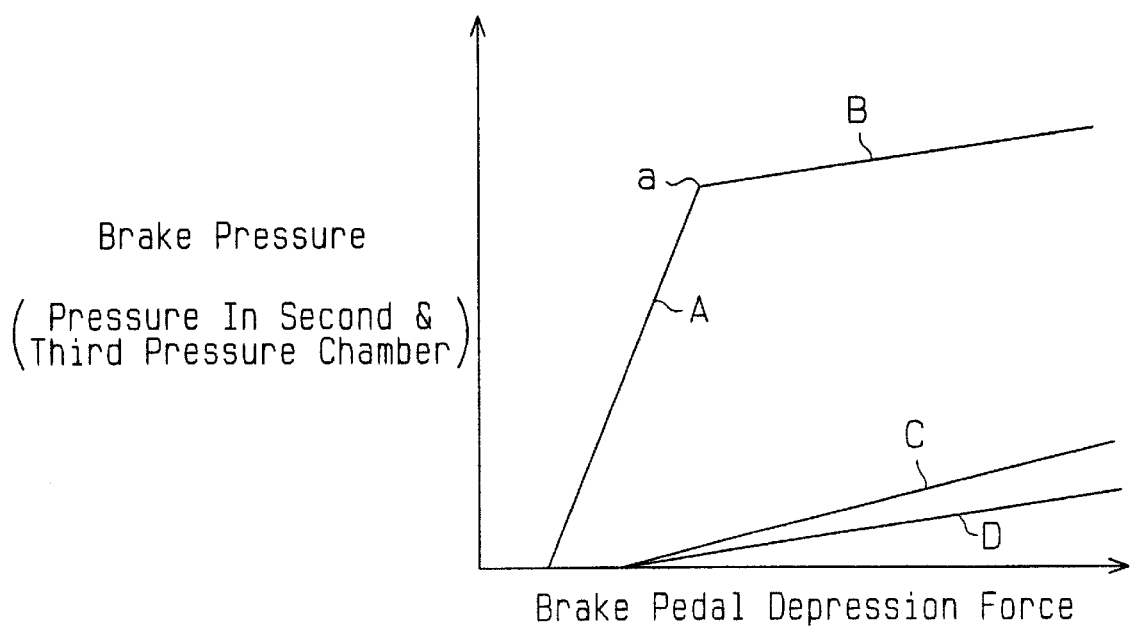
FIG. 4 is a graph of the brake pedal depression force versus brake pressure illustrating the brake performance characteristics associated with the hydraulic brake device of the present invention.

By virtue of the forward movement of the larger diameter piston 311, the first seal 313 provided on the larger diameter portion 311 passes the port 305b provided on the second body piece 305, thereby interrupting communication between the first pressure chamber PC1 and the reservoir tank. Hydraulic pressure is thus generated in the first pressure chamber PC1 in response to the forward or leftward movement of the larger diameter piston 311. The brake pedal (brake operation member) thereafter receives a reaction force corresponding to the pressure in the first pressure chamber PC1 (effective sealing area SO). Because the effective area SO is greater than the effective area S1 of the first floating piston 321, the first floating piston 321 is moved in the forward or leftward direction in accordance with the forward or leftward movement of the larger diameter piston 311 so as to be separated therefrom. Under this condition, the smaller diameter piston 315 and the first floating piston 321 are moved relatively separately. The movement of the first floating piston 321 generates a pressure in the second pressure chamber PC2 and similarly, the second floating piston 323 is moved in the forward or leftward direction by the pressure in the second pressure chamber PC2. This eventually generates a pressure in the third pressure chamber PC3. The pressure generated in the second and third pressure chambers PC2, PC3 is applied to the respective wheel cylinders to achieve brake operation. This is shown in FIG. 4 at line A.

When the brake operation force (brake pedal depression force) is increased and reaches a predetermined boosting limit value (i.e., the dead point identified as point "a" in FIG. 4) by the booster 1, the pressure in the second and third pressure chambers PC2, PC3 thereafter only increases in accordance with the increased force of the brake operation force. This is represented by the line "B" in FIG. 4.

Should the booster 1 become defective due to a failure of the vacuum supply or for some other reason, the brake operation force transmitted to the input rod 113 is directly transmitted to the smaller diameter piston 315 via the air valve 115, the intermediate rod 119, the reaction disc plate 129, the output rod 131 and the adjusting rod 133, without pushing the larger diameter piston 311 by the power piston. The smaller diameter piston 315 thus moves relative to the larger diameter piston 311. By virtue of the movement of the smaller diameter piston 315, the third seal 319 moves in the forward direction (i.e., to the left) passing the port 311b of the larger diameter piston 311. The first pressure chamber PC1 thus communicates with the atmosphere via the port 311b, the port 311a, the relief chamber RC, the port 305a, the port 301a, and the inlet port 337 of the cylinder body 301.

Accordingly, hydraulic pressure is not generated in the first pressure chamber PC1 and the first floating piston 321 is directly pushed by the smaller diameter piston 315 to generate hydraulic pressure in the second pressure chamber PC2. This pushes the second floating piston 323 in the forward or leftward direction to generate hydraulic pressure in the third pressure chamber PC3. The pressure in the third pressure chamber PC3 is then transmitted to the respective wheel cylinders to apply a braking force to the wheels of the vehicle. The brake pedal receives a reaction force in response to the generated hydraulic pressure in the second pressure chamber PC2 having an effective area SI. The brake performance under this condition is shown as line "C" in FIG. 4. The brake pressure indicated by line C is higher than the brake pressure indicated by the line D which corresponds to the pressure in the first pressure chamber PC1 having an effective area SO.

Figure 3:
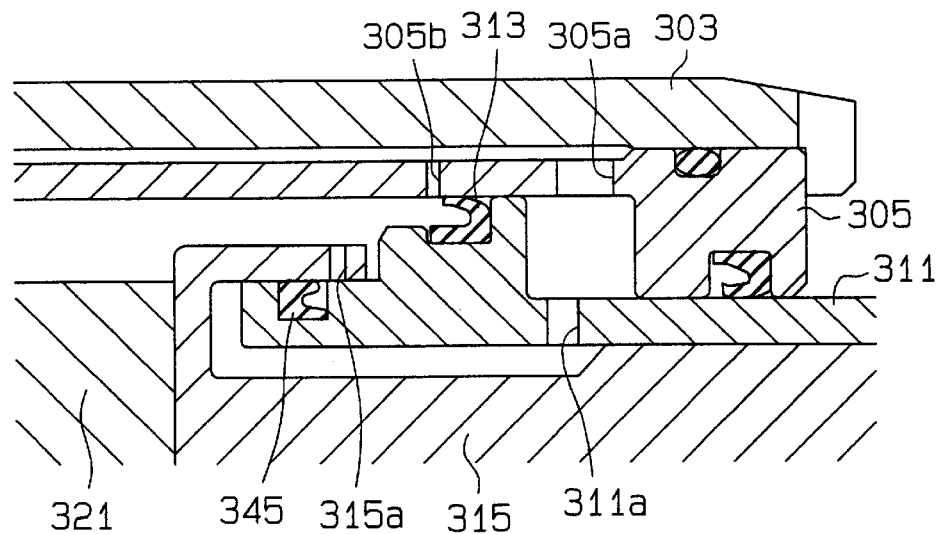
FIG. 3 is an enlarged cross-sectional view of a portion of a hydraulic brake device in accordance with a different embodiment of the present invention.

FIG. 3 shows another embodiment of the hydraulic brake device of the invention. In this version of the hydraulic device, a seal 345 is provided on the larger diameter piston 311 instead of the third seal 319 provided on the smaller diameter piston 315 of the first embodiment. In addition, a port 315a is provided on the smaller diameter piston 315 instead of the port 311b provided on the larger diameter piston of the first embodiment. The operation and the other features of the hydraulic brake device according to this second embodiment are basically the same as in the first embodiment described above and so a detailed explanation of such features and the operation is not repeated.

The embodiments of the invention described above and illustrated is the drawing figures are in the form of a tandem master cylinder. However, it is to be understood that a single master cylinder can be applied in connection with the present invention while still achieving the same advantageous results.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A hydraulic brake device comprising:
   a cylinder;
   a larger diameter piston movable within the cylinder in response to movement of a power piston of a brake booster;
   a smaller diameter piston engaged with an inner peripheral portion of the large diameter piston and movable relative to the larger diameter piston in response to operation of a brake operation member;
   a floating piston engaged with the smaller diameter piston and movable relative to the smaller diameter piston;
   a first pressure chamber defined by the larger diameter piston and the smaller diameter piston;
   a second pressure chamber defined by the cylinder and the floating piston and hydraulically connected to a wheel brake cylinder;
   a relief chamber defined by the cylinder and the larger diameter piston; and
   a switching device disposed between the larger diameter piston and the smaller diameter piston, the switching device normally interrupting fluid communication between the first pressure chamber and the relief chamber and establishing communication between the first pressure chamber and the relief chamber when the larger diameter piston and the smaller diameter piston are moved relative to one another.

2. The hydraulic brake device according to claim 1, wherein the switching device includes a port provided on the larger diameter piston which provides the fluid communication between the first pressure chamber and the relief chamber upon relative movement between the larger diameter piston and the smaller diameter piston.

3. The hydraulic brake device according to claim 2, wherein the port is a first port, and including a second port formed in the larger diameter portion communicating the relief chamber with the first port upon relative movement between the larger diameter piston and the smaller diameter piston.

4. The hydraulic brake device according to claim 1, wherein the switching device includes a seal member provided on the smaller diameter piston to normally interrupt the fluid communication between the first pressure chamber and the relief chamber prior to relative movement between the larger diameter piston and the smaller diameter piston.

5. The hydraulic brake device according to claim 1, wherein the switching device includes a port formed on the smaller diameter piston which provides the fluid communication between the first pressure chamber and the relief chamber upon relative movement between the larger diameter piston and the smaller diameter piston.

6. The hydraulic brake device according to claim 5, wherein the port is a first port, and including a second port formed in the larger diameter portion communicating the relief chamber with the first port upon relative movement between the larger diameter piston and the smaller diameter piston.

7. The hydraulic brake device according to claim 1, wherein the switching device includes a seal member provided on the larger diameter piston to normally interrupt the fluid communication between the first pressure chamber and the relief chamber prior to relative movement between the larger diameter piston and the smaller diameter piston.

8. The hydraulic brake device according to claim 1, including another floating piston positioned within the cylinder to define a third pressure chamber.

9. A hydraulic brake device comprising:
   a cylinder;
   a larger diameter piston movable within the cylinder in response to movement of a power piston of a brake booster;
   a smaller diameter piston engaged with an inner peripheral portion of the large diameter piston and movable relative to the larger diameter piston in response to operation of a brake operation member;
   a floating piston engaged with the smaller diameter piston and movable relative to the smaller diameter piston;
   a first pressure chamber defined by the larger diameter piston, the smaller diameter piston and the floating piston;
   a second pressure chamber defined by the cylinder and the floating piston and hydraulically connected to a wheel brake cylinder;
   a relief chamber defined by the cylinder and the larger diameter piston;
   a seal member provided on one of the larger diameter piston and the smaller diameter piston for interrupting fluid communication between the first pressure chamber and the relief chamber; and
   a port provided on the other of the larger diameter piston and the smaller diameter piston, with fluid communication between the first pressure chamber and the relief chamber being established by way of the port upon relative movement between the larger diameter piston and the smaller diameter piston.

10. The hydraulic brake device according to claim 9, wherein the port is provided on the larger diameter piston and the seal member is provided on the smaller diameter piston at a position rearward of the port.

11. The hydraulic brake device according to claim 10, wherein the port is a first port, and including a second port formed in the larger diameter portion communicating the relief chamber with the first port upon relative movement between the larger diameter piston and the smaller diameter piston.

12. The hydraulic brake device according to claim 9, wherein the seal member is provided on the larger diameter piston and the port is provided on the smaller diameter piston at a position rearward of the seal member.

13. The hydraulic brake device according to claim 12, wherein the port is a first port, and including a second port formed in the larger diameter portion communicating the relief chamber with the first port upon relative movement between the larger diameter piston and the smaller diameter piston.

14. A hydraulic brake system for a vehicle, comprising:
   a brake operation member operated by a driver of the vehicle to generate a brake operation force;

a booster device having a power piston operatively connected to the brake operation member for boosting the brake operation force generated by the brake operation member;

a wheel brake cylinder for producing braking force in response to the brake operation force; and a brake device comprising a cylinder, a larger diameter piston movable within the cylinder in response to movement of the power piston of the booster, a smaller diameter piston engaged with an inner peripheral portion of the larger diameter piston and movable relative to the larger diameter piston in response to the operation of the brake operation member, a floating piston engaged with the smaller diameter piston and movable relative to the smaller diameter piston, a first pressure chamber defined by the larger diameter piston and the smaller diameter piston, a second pressure chamber defined by the cylinder and the floating piston and hydraulically connected to the wheel brake cylinder, a relief chamber defined by the cylinder and the larger diameter piston, and a switching device disposed between the larger diameter piston and the smaller diameter piston for normally interrupting fluid communication between the first pressure chamber and the relief chamber and for establishing fluid communication between the first pressure chamber and the relief chamber upon relative movement between the larger diameter piston and the smaller diameter piston.

15. The hydraulic brake system according to claim 14, wherein the switching device includes a port provided on the larger diameter piston and a seal member provided on the smaller diameter piston.

16. The hydraulic brake system according to claim 15, wherein the seal member is positioned rearward of the port prior to relative movement between the larger diameter piston and the smaller diameter piston and moves to a position forward of the port upon relative movement between the larger diameter piston and the smaller diameter piston.

17. The hydraulic brake system according to claim 14, wherein the switching device includes a port provided on the smaller diameter piston and a seal member provided on the larger diameter piston.

18. The hydraulic brake system according to claim 17, wherein the port is positioned rearward of the seal member prior to relative movement between the larger diameter piston and the smaller diameter piston and moves to a position forward of the seal member upon relative movement between the larger diameter piston and the smaller diameter piston.

* * * * *